(12) United States Patent
Jeong et al.

(10) Patent No.: US 12,028,652 B2
(45) Date of Patent: Jul. 2, 2024

(54) VEHICLE IMAGE CONTROL APPARATUS AND METHOD THEREOF

(71) Applicants: Hyundai Motor Company, Seoul (KR); Kia Corporation, Seoul (KR); YURA CORPORATION CO., LTD., Seongnam-si (KR); HYUNDAI MOBIS CO., LTD., Seoul (KR)

(72) Inventors: Dong Hyuk Jeong, Hwaseong-Si (KR); Moon Hyun Seo, Hwaseong-Si (KR); Gyun Ha Kim, Incheon (KR); Woo Sung Lee, Yongin-Si (KR); Jae Rim Kim, Seoul (KR)

(73) Assignees: Hyundai Motor Company, Seoul (KR); Kia Corporation, Seoul (KR); YURA CORPORATION CO., LTD., Seongnam-si (KR); HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/739,440

(22) Filed: May 9, 2022

(65) Prior Publication Data
US 2022/0408061 A1    Dec. 22, 2022

(30) Foreign Application Priority Data
Jun. 22, 2021    (KR) .................. 10-2021-0081153

(51) Int. Cl.
*H04N 7/18*    (2006.01)
*B60W 40/02*    (2006.01)
(Continued)

(52) U.S. Cl.
CPC ............ *H04N 7/181* (2013.01); *B60W 40/02* (2013.01); *B60W 50/02* (2013.01); *H04N 23/65* (2023.01); *B60W 2420/403* (2013.01)

(58) Field of Classification Search
CPC ........ H04N 7/181; H04N 23/65; H04N 23/60; H04N 23/651; B60W 40/02; B60W 50/02; B60W 2420/42
(Continued)

(56) References Cited

U.S. PATENT DOCUMENTS 10,506,161 B2 *   12/2019   Bhaskara ............... H04N 23/65
10,616,484 B2 *   4/2020    Cohen .................. H04N 23/651
(Continued)

FOREIGN PATENT DOCUMENTS

JP     2020-136715 A    8/2020
KR    10-1634242 B     6/2016
KR    10-2111755 B     5/2020

*Primary Examiner* — Christopher S Kelley
*Assistant Examiner* — Asmamaw G Tarko
(74) *Attorney, Agent, or Firm* — MORGAN, LEWIS & BOCKIUS LLP

(57) ABSTRACT

A vehicle image control apparatus for an image of a vehicle camera equipped with no image signal processor (ISP) and a method thereof, includes a first image controller equipped with a first ISP that performs image processing, supplies power to a camera device provided in a vehicle and equipped with no ISP, and the camera device obtains a surrounding image of the vehicle and transmits the surrounding image to the first image controller. The first image controller selectively shares the surrounding image with a second image controller equipped with a second ISP that performs image processing. Accordingly, it is possible to implement an efficient vehicle image-related system such that a plurality of controllers share one or more cameras equipped with no ISP.

18 Claims, 6 Drawing Sheets

(51) Int. Cl.
  *B60W 50/02*     (2012.01)
  *H04N 23/65*     (2023.01)
(58) Field of Classification Search
  USPC .......................................................... 348/148
  See application file for complete search history.

(56) References Cited

U.S. PATENT DOCUMENTS

| | | | |
|---|---|---|---|
| 2002/0047910 A1* | 4/2002 | Tariki | H04N 23/66 |
| | | | 348/E7.086 |
| 2014/0139024 A1* | 5/2014 | Yun | G06F 1/324 |
| | | | 307/31 |
| 2014/0181035 A1* | 6/2014 | Moue | G06F 16/2255 |
| | | | 707/647 |
| 2014/0320618 A1* | 10/2014 | Akahane | H04N 25/616 |
| | | | 348/302 |
| 2016/0379352 A1* | 12/2016 | Zhang | G06N 3/045 |
| | | | 382/157 |
| 2017/0237937 A1* | 8/2017 | Motohashi | H04N 23/90 |
| | | | 348/148 |
| 2018/0359392 A1* | 12/2018 | Cohen | G02B 13/009 |
| 2019/0132513 A1* | 5/2019 | Bhaskara | H04N 23/60 |
| 2020/0389588 A1* | 12/2020 | Sharma | G06T 1/00 |
| 2020/0413000 A1* | 12/2020 | Breuer | H04N 5/77 |
| 2021/0120175 A1* | 4/2021 | Park | H04N 23/665 |
| 2021/0149400 A1* | 5/2021 | Takakura | B60R 1/00 |
| 2022/0176908 A1* | 6/2022 | Suenaga | B60R 25/403 |
| 2022/0375374 A1* | 11/2022 | Nicholson | H04N 7/183 |

* cited by examiner

VEHICLE IMAGE CONTROL APPARATUS AND METHOD THEREOF

CROSS-REFERENCE TO RELATED APPLICATION

The present application claims priority to Korean Patent Application No. 10-2021-0081153, filed on Jun. 22, 2021, the entire contents of which is incorporated herein for all purposes by this reference.

BACKGROUND OF THE INVENTION

Field of the Invention

The present invention relates to a vehicle image control apparatus and a method thereof, and more particularly, to a vehicle image control apparatus for an image of a vehicle camera equipped with no image signal processors (ISP), and a method thereof.

Description of Related Art

A built-in cam system may obtain front-view and rear-view images according to conditions by obtaining surrounding images through a vehicle's cameras, and checks function settings and stored images in cooperation with an Audio, Video, Navigation (AVN) of the vehicle. Even in a parking mode where another controller of the vehicle is turned off or a controller of the built-in cam system is in a sleep mode, both the controllers may be directly connected to a rear camera which is commonly used to record images. An image captured through the rear camera is shared with at least one controller of a built-in cam, a Surround View Monitor (SVM), or an Advanced Driver Assistance System-Parking (ADAS-PRK), so that the controller of the built-in cam, the SVM, or the ADAS-PRK may be connected to the rear camera via a coaxial cable.

it is necessary to develop an efficient and applicable architecture for an image control system in which an image signal processor (ISP) that performs an image processing function for camera images is embedded in a controller and not a camera.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a vehicle image control apparatus for an image of a vehicle camera equipped with no image signal processors (ISP), and a method thereof.

Various aspects of the present invention provide a vehicle image control apparatus of facilitating the application of a technology for transferring an ISP, which had been built in a camera, to a controller and a method thereof.

Various aspects of the present invention provide a vehicle image control apparatus of facilitating switching of control between a plurality of controllers for controlling images of a camera equipped with no ISPs and a method thereof.

Various aspects of the present invention provide a vehicle image control apparatus of minimizing power consumption by appropriately operating a plurality of controllers for controlling images of a camera equipped with no ISP while driving and parking, and a method thereof.

Various aspects of the present invention provide a vehicle image control apparatus of implementing an efficient vehicle image related system by sharing one or more cameras equipped with no ISP among a plurality of controllers.

The technical problems to be solved by the present inventive concept are not limited to the aforementioned problems, and any other technical problems not mentioned herein will be clearly understood from the following description by those skilled in the art to which various exemplary embodiments of the present invention pertains.

According to various aspects of the present invention, a vehicle image control apparatus includes a camera device provided in a vehicle and equipped with no image signal processor (ISP) to obtain a surrounding image of the vehicle and to transmit the surrounding image to a first image controller, the first image controller equipped with a first ISP for performing image processing to supply power to the first camera device and selectively share the surrounding image with a second image controller, and the second image controller equipped with a second ISP and configured for performing image processing.

According to various exemplary embodiments of the present invention, the first image controller may perform the image processing on the surrounding image through the first ISP, and store the processed surrounding image in a non-transitory storage medium.

According to various exemplary embodiments of the present invention, the second image controller may perform the image processing on the surrounding image through the second ISP, and output the processed surrounding image in real time.

According to various exemplary embodiments of the present invention, the camera device may include a camera configured to obtain a rear-view image of the vehicle.

According to various exemplary embodiments of the present invention, the camera device may include two or more cameras that obtain surrounding images in different directions with respect to the vehicle.

According to various exemplary embodiments of the present invention, the first image controller may share the surrounding image to the second image controller when the vehicle is driving.

According to various exemplary embodiments of the present invention, the first image controller may share the surrounding image with the second image controller when the vehicle is parked, and the second image controller may be turned off when the vehicle is parked.

According to various exemplary embodiments of the present invention, the second image controller may request the first image controller to reset a power supply that supplies the power to the camera device when the second image controller determines that an abnormality has occurred in the camera device.

According to various exemplary embodiments of the present invention, the first image controller may share control authority for the camera device with the second image controller.

The second image controller may transmit information on a parameter related to the image processing for the surrounding image obtained by the camera device to the first image controller.

According to various exemplary embodiments of the present invention, the first image controller may share information as to whether the first image controller has control authority for internal communication of the camera device or whether the second image controller has the control authority for internal communication of the camera device, with the second image controller.

According to various aspects of the present invention, a vehicle image control method includes supplying, by a first image controller equipped with a first ISP configured for performing image processing, power to a camera device provided in a vehicle and equipped with no ISP, obtaining, by the camera device, a surrounding image of the vehicle, transmitting, by the camera device, the surrounding image to the first image controller, and selectively sharing, by the first image controller, the surrounding image with a second image controller equipped with a second ISP configured for performing image processing.

According to various exemplary embodiments of the present invention, the vehicle image control method may further include performing, by the first image controller, image processing on the surrounding image through the first ISP, and storing, by the first image controller, the processed surrounding image in a non-transitory storage medium.

According to various exemplary embodiments of the present invention, the vehicle image control method may further include performing, by the second image controller, image processing on the surrounding image through the second ISP, and outputting, by the second image controller, the processed surrounding image in real time.

According to various exemplary embodiments of the present invention, the selectively sharing, by the first image controller, of the surrounding image with the second image controller equipped with the second ISP configured for performing the image processing may include sharing, by the first image controller, the surrounding image with the second image controller when the vehicle is driving.

According to various exemplary embodiments of the present invention, the vehicle image control method may further include sharing, by the first image controller, no surrounding image with the second image controller when the vehicle is parked and turning off the second image controller when the vehicle is parked.

According to various exemplary embodiments of the present invention, the vehicle image control method may further include requesting, by the second image controller, the first image controller to reset a power supply that supplies the power to the camera device when the second image controller determines that an abnormality has occurred in the camera device.

According to various exemplary embodiments of the present invention, the vehicle image control method may further include sharing, by the first image controller, the control authority for the camera device with the second image controller.

According to various exemplary embodiments of the present invention, the vehicle image control method may further include transmitting, by the second image controller, information on a parameter related to image processing for the surrounding image obtained by the camera device to the first image controller.

According to various exemplary embodiments of the present invention, the vehicle image control method may further include sharing, by the first image controller, information as to whether the first image controller has control authority for internal communication of the camera device or whether the second image controller has the control authority for the internal communication of the camera device, with the second image controller.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
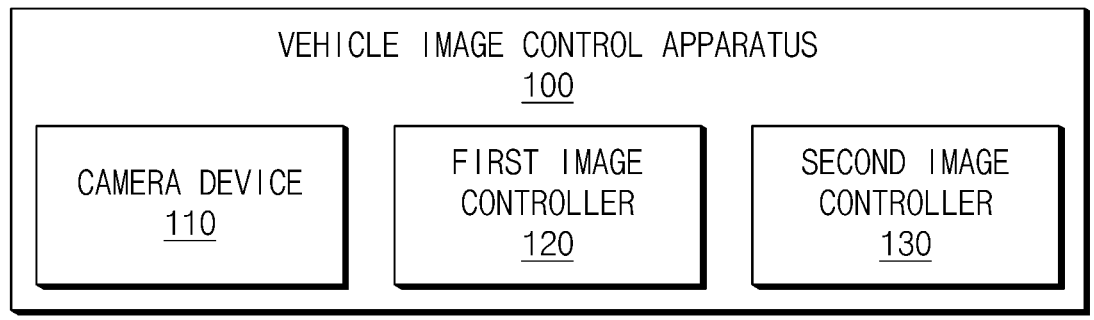
FIG. 1 is a block diagram showing a vehicle image control apparatus according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the exemplary drawings. In adding the reference numerals to the components of each drawing, it should be noted that the identical or equivalent component is designated by the identical numeral even when they are displayed on other drawings. Furthermore, in describing the exemplary embodiment of the present invention, a detailed description of well-known features or functions will be ruled out in order not to unnecessarily obscure the gist of the present invention.

In describing the components of the exemplary embodiment according to various exemplary embodiments of the present invention, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which various exemplary embodiments of the present invention pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present invention will be described in detail with reference to FIGS. 1 to 6.

FIG. 1 is a block diagram showing a vehicle image control apparatus according to various exemplary embodiments of the present invention.

A vehicle image control apparatus 100 according to various exemplary embodiments of the present invention may be implemented inside or outside a vehicle. In the instant case, the vehicle image control apparatus 100 may be integrally formed with the internal control units of the vehicle, or may be implemented as a separate hardware device and connected to the control units of the vehicle through connection means.

As an exemplary embodiment of the present invention, the vehicle image control apparatus 100 may be implemented integrally with a vehicle, may be implemented to be installed/attached to a vehicle as a configuration separate from the vehicle, or some components thereof may be implemented integrally with a vehicle and the other components may be implemented to be installed/attached to the vehicle as a configuration separate from the vehicle.

Referring to FIG. 1, the vehicle image control apparatus 100 may include a camera device 110, a first image controller 120, and a second image controller 130.

The camera device 110 may be provided in the vehicle and equipped with no image signal processor (ISP) and may obtain a surrounding image of the vehicle.

For example, the camera device 110 may obtain an image even in a situation in which another control system of the vehicle is turned off or is in a sleep mode.

The camera device 110 may transmit the surrounding image to the first image controller 120.

For example, the camera device 110 may transmit the obtained surrounding image to two or more vehicle controllers connected through a coaxial cable.

For example, the camera device 110 may include a camera that obtains an image for the rear of the vehicle.

As an example, the camera device 110 may include two or more cameras that obtain surrounding images in different directions with respect to the vehicle.

For example, the camera device 110 may include a camera for obtaining a front-view image of the vehicle, a camera for obtaining a rear-view image of the vehicle, a camera for obtaining a left-view image of the vehicle, and a camera for obtaining a right-view image of the vehicle.

The image obtained through the camera device 110 may include an image commonly used by the first image controller 120 and the second image controller 130.

The first image controller 120 may be provided with a first ISP that performs image processing and supply power to the camera device 110.

For example, the first image controller 120 may supply power to the camera device 110, and control image capturing and image transmission of the camera device 110.

For example, the first ISP and a second ISP to be described later may perform image processing functions such as Auto White Balance (AWB), Auto Exposure (AE), and noise removal.

The first image controller 120 may selectively share the surrounding image with the second image controller 130.

As an example, the first image controller 120 may selectively share the surrounding image with the second image controller 130 based on whether the vehicle is driving or whether the vehicle is parked.

For example, when the vehicle is driving, the first image controller 120 may share the surrounding image with the second image controller 130.

For example, when the vehicle is parked, the first image controller 120 may not share the surrounding image with the second image controller 130.

As an example, the first image controller 120 may be connected to a driving system of the vehicle to obtain whether the vehicle is driving or whether the vehicle is parked from the driving system.

For example, the first image controller 120 may perform image processing on the surrounding image through the first ISP, and store the image-processed surrounding image in a non-volatile memory.

As an example, the first image controller 120 may include a controller of a vehicle image recording device built in the vehicle that stores the surrounding image in the non-volatile memory.

For example, the first image controller 120 may include a controller of a built-in cam of the vehicle.

For example, the first image controller 120 may share control authority for the camera device 110 with the second image controller 130.

For example, the first image controller 120 may receive a control command for the camera device 110 from the second image controller 130, and control image obtaining and image transmission of the camera device 110 to share control authority for the camera device 110 with the second image controller 130.

For example, the first image controller 120 may share information with the second image controller 130 as to whether the first image controller 120 has control authority for internal communication of the camera device 110 or whether the second image controller 130 has control authority for internal communication of the camera device 110.

For example, to prevent a conflict of control authority for internal communication of the camera device 110, the first image controller 120 may share, with the second image controller 130, information as to whether the first image controller 120 has control authority for internal communication of the camera device 110 or whether the second image controller 130 has control authority for internal communication of the camera device 110.

As various exemplary embodiments of the present invention, to prevent a conflict of control authority for internal communication of the camera device 110, the second image controller 130 may share, with the first image controller 120, information as to whether the first image controller 120 has control authority for internal communication of the camera device 110 or whether the second image controller 130 has control authority for internal communication of the camera device 110.

The second image controller 130 may include a second ISP that performs image processing.

For example, the second image controller 130 may perform image processing on a surrounding image through the second ISP and output the processed surrounding image in real time.

For example, the second image controller 130 may include a controller of a device that outputs the surrounding image through an output device such as an Audio, Video, Navigation (AVN) of the vehicle to display a surrounding situation of the vehicle in real time.

For example, the second image controller 130 may include a controller of a Surround View Monitor (SVM) of the vehicle or a controller of an Advanced Driver Assistance System-Parking (ADAS-PRK).

For example, the second image controller 130 may be turned off when the vehicle is parked.

For example, when the vehicle is parked, the second image controller 130 may be turned off to minimize power consumption for image processing.

As an example, the second image controller 130 may be connected to a driving system of the vehicle to obtain whether the vehicle is driving or whether the vehicle is parked from the driving system.

For example, when it is determined that an abnormality has occurred in the camera device 110, the second image controller 130 may request the first image controller 120 to reset a power supply that supplies power to the camera device 110.

For example, the second image controller 130 may determine whether an abnormality has occurred in the camera device 110 while performing image processing through the second ISP or communicating image information.

For example, when it is determined that an abnormality has occurred in the camera device 110, the second image controller 130 may request the first image controller 120 to reset the power supply that supplies power to the camera device 110, and the first image controller 120 which has requested to reset the power supply may reset the power supply that supplies power to the camera device 110.

For example, the second image controller 130 may transmit information on a parameter related to image processing for a surrounding image obtained by the camera device 110 to the first image controller 120.

As an example, the second image controller 130 may transmit information on a parameter related to image processing through the ISP to the first image controller 120.

As an example, the first image controller 120 may perform image processing on the surrounding image through the first ISP based on the received information on the parameter related to image processing through the ISP.

As various exemplary embodiments of the present invention, the first image controller 120 may transmit information on a parameter related to image processing through the ISP to the second image controller 130.

In the instant case, the second image controller 130 may perform image processing on the surrounding image through the second ISP based on the received information on the parameter related to image processing through the ISP.

Figure 2:
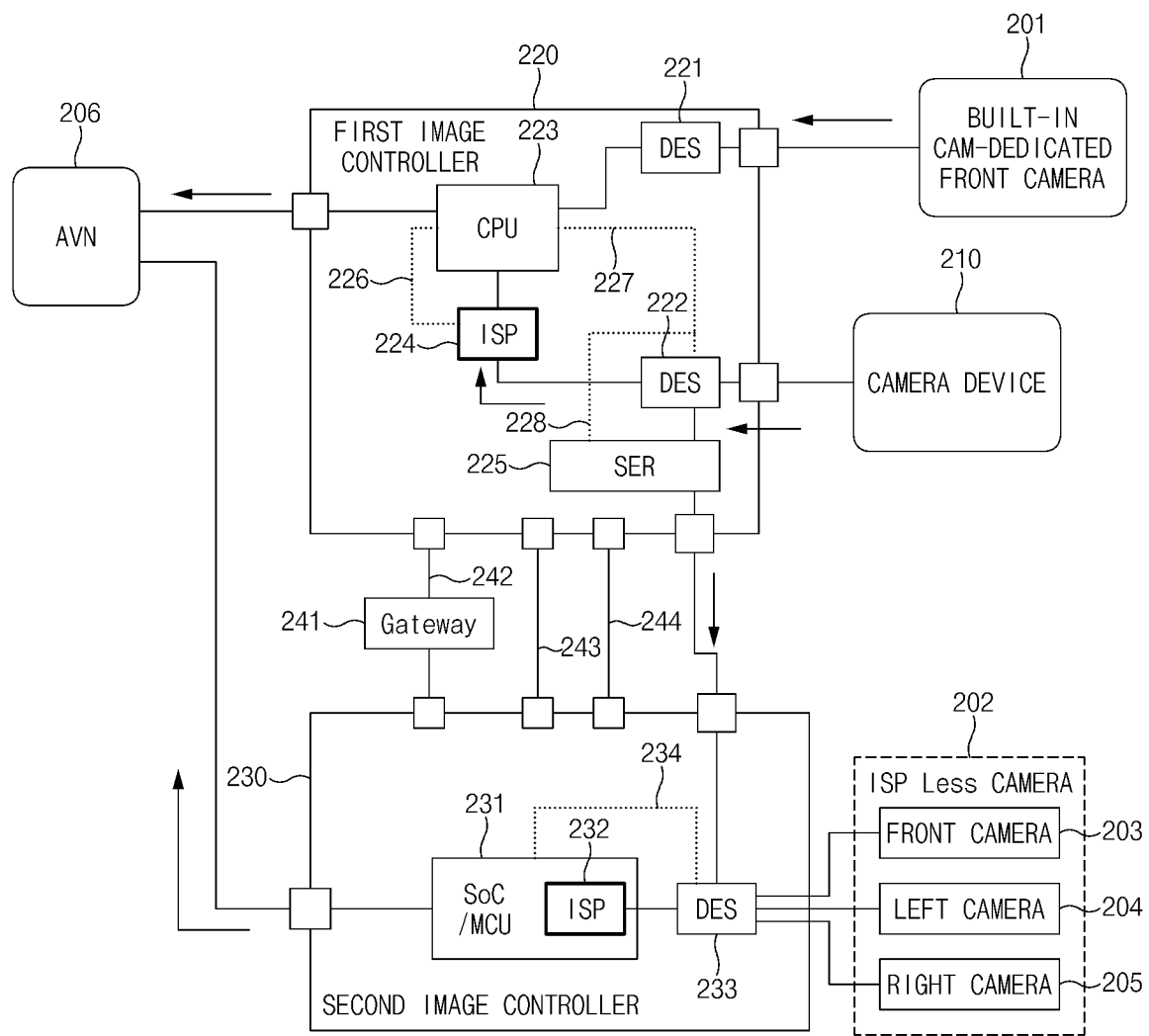
FIG. 2 is a diagram illustrating a detailed configuration of a vehicle image control apparatus according to various exemplary embodiments of the present invention.

FIG. 2 is a diagram illustrating a detailed configuration of a vehicle image control apparatus according to various exemplary embodiments of the present invention.

Referring to FIG. 2, a built-in cam-dedicated front camera 201 may obtain an image of the front of a vehicle and transmit the obtained image to a DES 221 of a first image controller 220.

A camera device 210 may be equipped with no ISP. The camera device 210 may obtain a surrounding image of the vehicle and transmit the obtained image to a DES 222 of the first image controller 220.

For example, the camera device 210 may obtain an image of the rear of the vehicle, and transmit the obtained rear image to the DES 222 of the first image controller 220.

The first image controller 220 may include the DES (Deserializer) 221 connected to the built-in cam-dedicated front camera 201, the DES 222 connected to the camera device 210, a CPU (Central Processing Unit) 223, an ISP 224 and an SER (Serializer) 225.

For example, the first image controller 220 may record images from the front and rear cameras of the vehicle while driving or parking according to a user's settings, and store the images in a nonvolatile memory in a form of a video file.

As an example, the first image controller 220 may supply power to the camera device 210 and share the surrounding image of the vehicle obtained by the camera device 210 with a second image controller 230.

For example, the first image controller 220 may use a front-view image of the vehicle obtained by the built-in cam-dedicated front camera 201 for exclusive use without sharing the front-view image with the second image controller 230.

The DESs 221 and 222 may convert camera image signals input from the outside of the controller into signals that are able to be input to the controller.

For example, the DESs 221 and 222 may receive signals for images obtained through the built-in cam-dedicated front camera 201 and the camera device 210, respectively, and convert the signals into signals that are able to be input to the controller.

The CPU 223 may perform overall control for the first image controller 220.

For example, the CPU 223 may be integrated with a microcontroller unit (MCU) of the vehicle or implemented in a form of a system on chip (SoC) to perform overall control for the first image controller 220.

As an example, the CPU 223 may control the ISP 224 through Inter-Integrated Circuit (I2C) communication 226 and set ISP parameters.

The ISP 224 may perform image processing on images obtained through the built-in cam-dedicated front camera 201 and the camera device 210.

As an example, the CPU 223 may perform image processing on the images obtained through the built-in cam-dedicated front camera 201 and the camera device 210 to transmit the images to an AVN 206 of the vehicle.

For example, the CPU 223 may perform communication 227 with the DES 222 to initialize the DES 222 and the SER 225.

A communication circuit for the communication 227 connecting the CPU 223 and the DES 222 may be connected to a communication circuit for communication 228 connecting the DES 222 and the SER 225, so that, the CPU 223 may initialize the DES 222 and the SER 225 through the communication 227 and 228.

As an example, the DES 222 and the SER 225 in the first image controller 220 may be connected through the communication 228 and thus, information on images, obtained by the camera device 210 and transmitted to the DES 222, may be transmitted to the SER 225 via the communication 228.

The SER 225 may convert a camera image signal into a signal for transmission to the outside of the controller.

For example, the SER 225 may convert a signal for a surrounding image of the vehicle, received through the DES 222 and transmit the converted signal to a DES 233 of the second image controller 230.

For example, the internal communications 226, 227, 228, and 234 disclosed herein may be implemented through Universal Asynchronous Receiver/Transmitter (UART), Serial Peripheral Interface (SPI) communication, or the like, in addition to I2C communication.

The second image controller 230 may include an SoC/MCU 231, an ISP 232, and the DES 233 connected to an ISPLess camera 202.

The SoC/MCU 231 may perform overall control for the second image controller 230.

The ISP 232 may be embedded in the SoC/MCU 231, or may be provided separately. The ISP 232 may be connected to the SoC/MCU 231 and be controlled by the SoC/MCU 231 when the ISP 232 is provided separately.

The ISP 232 may perform image processing on an image obtained through the camera device 210 and the ISPLess camera 202.

The DES 233 may receive a front-view image of the vehicle, a left-view image of the vehicle, and a right-view image of the vehicle, which are obtained through the ISPLess camera 202 including a front camera 203, a left camera 204 and a right camera 205.

The front camera 203, the left camera 204, and the right camera 205 included in the ISPLess camera 202 may be equipped with no ISP.

The DES 233 may receive an image of the rear of the vehicle obtained by the camera device 210 from the SER 225 of the first image controller 220.

For example, the DES 233 may include one or more DESs respectively corresponding to the cameras.

The DES 233 may convert a signal for the received image into a signal which is configured to be input into the controller.

The DES 233 may convert the signal for the received image into the signal which is configured to be input into the controller and transmit the converted signal to the SoC/MCU 231 through communication 234.

The SoC/MCU 231 may perform image processing on surrounding images of the vehicle, which are obtained through the camera device 210, the front camera 203, the left camera 204, and the right camera 205, through the ISP 232, and transmit the images to the AVN 206 of the vehicle.

A gateway 241 is configured as a gateway when the first image controller 220 and the second image controller 230 are connected through heterogeneous vehicle communication.

The first image controller 220 may transmit and receive data or commands to and from the second image controller 230 through communication 242 through the gateway 241.

For example, the first image controller 220 may receive an ISP-related parameter from the second image controller 230 through the communication 242 through the gateway 241.

For example, the first image controller 220 may transmit and receive control and a reset request to and from the second image controller 230 and the camera device 210 through the communication 242 through the gateway 241.

For example, the first image controller 220 may communicate with the second image controller 230 through hard wires 243 and 244.

The hard wires 243 and 244 are not essential components to implement the present invention, and may be additionally used when deterioration has occurred in system booting time or performance because necessary communication is performed in a process of implementing the present invention through vehicle communication including no hard wire.

For example, the first image controller 220 may transmit information on the master authority of internal communication of the camera device 210 to the second image controller 230 through the hard wire 243 to prevent conflict of communication between the first image controller 220 and the second image controller 230.

For example, when the first image controller 220 transmits a low signal (e.g., 0V) to the second image controller 230 through the hard wire 243, it may mean that the first image controller 220 has master authority of internal communication of the camera device 210. When the first image controller 220 transmits a high signal (e.g., 12V) to the second image controller 230 through the hard wire 243, it may mean that the second image controller 230 has master authority of internal communication of the camera device 210.

For example, when it is determined that an abnormality has occurred in the camera device 210, the second image controller 230 may transmit a reset request to the first image controller 220 via the hard wire 244.

For example, when it is determined that an abnormality has occurred in the camera device 210, the second image controller 230 may transmit a reset request via the hard wire 244 through a signal in the order of the low signal, the high signal, and the low signal.

Figure 3:
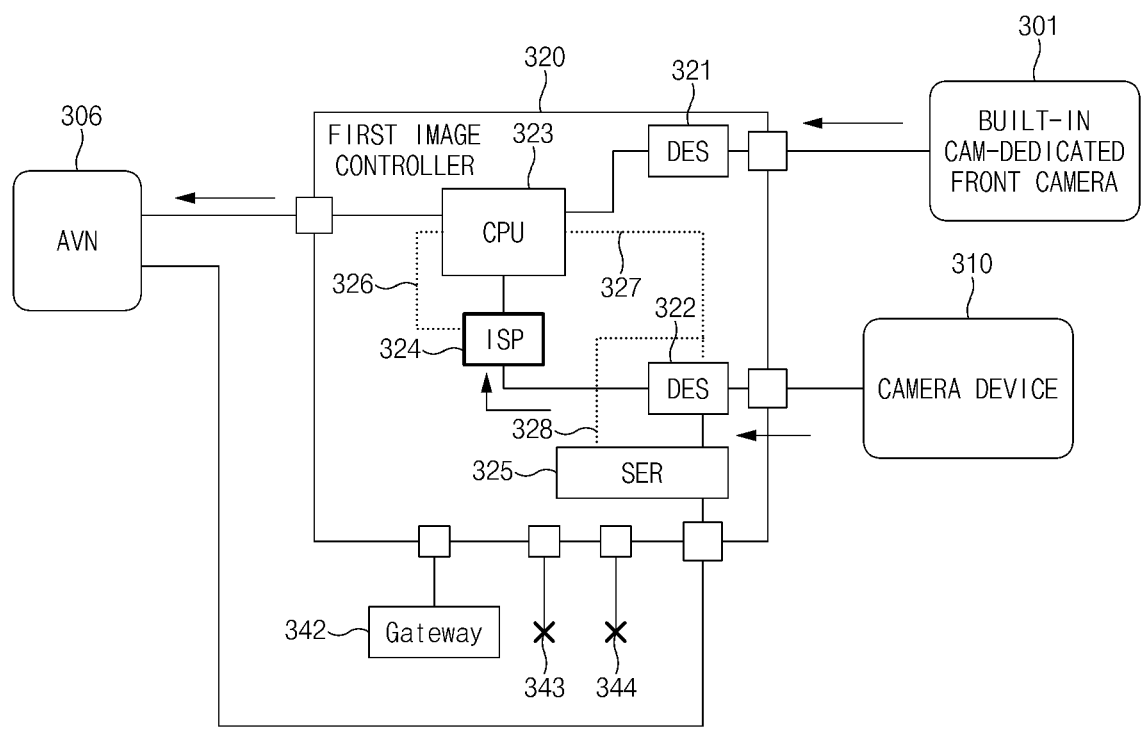
FIG. 3 is a diagram illustrating a case where a first image controller is configured to operate alone according to various exemplary embodiments of the present invention.

FIG. 3 is a diagram illustrating a case where a first image controller is configured to operate alone according to various exemplary embodiments of the present invention.

Referring to FIG. 3, when a second image controller is not included in options of a vehicle, or the second image controller is turned off and does not operate, a camera device 310 may transmit information on an obtained image to a first image controller 320.

In the instant case, the first image controller 320 may include a DES (Deserializer) 321 connected to a built-in cam-dedicated front camera 301, a DES 322 connected to the camera device 310, a CPU (Central Processing Unit) 323, an ISP 324 and SER (Serializer) 325.

Features of the first image controller 320, the DES 321 connected to the built-in cam-dedicated front camera 301, the DES 322 connected to the camera device 310, the CPU 323, the ISP 324 and the SER 325 which are not mentioned in the description with reference to FIG. 3 may be identical to features of the first image controller 220, the DES 221 connected to the built-in cam-dedicated front camera 201, the DES 222 connected to the camera device 310, the CPU 223, the ISP 224 and the SER 225 of FIG. 2.

The SER 325 of the first image controller 320 may transmit a surrounding image obtained through the camera device 310 to an AVN 306, not to the second image controller.

Furthermore, the first image controller 320 may not communicate with the second image controller via communication 342 through a gateway and communication 343 and 344 through a hard wire.

In the instant case, the camera device 310 may or may not have a built-in ISP. When the camera device 310 performs image processing on an image obtained by the camera device 310 by itself because the camera device 310 includes the ISP, the ISP 324 may simply bypass and transmit the processed image received from the camera device 310 to the CPU 323.

When the second image controller that outputs a surrounding image of the vehicle in real time is not included in the vehicle, or when the first image controller 320 operates alone because the second image controller is turned off, the surrounding image by the camera device 310 may be transmitted to the AVN 306 via the first image controller 320 and stored in a nonvolatile memory in a form of a video.

Furthermore, the first image controller 320 may not transmit and receive a reset request, information on control authority for the camera device 310, an ISP-related parameter, and the like with the second image controller.

Figure 4:
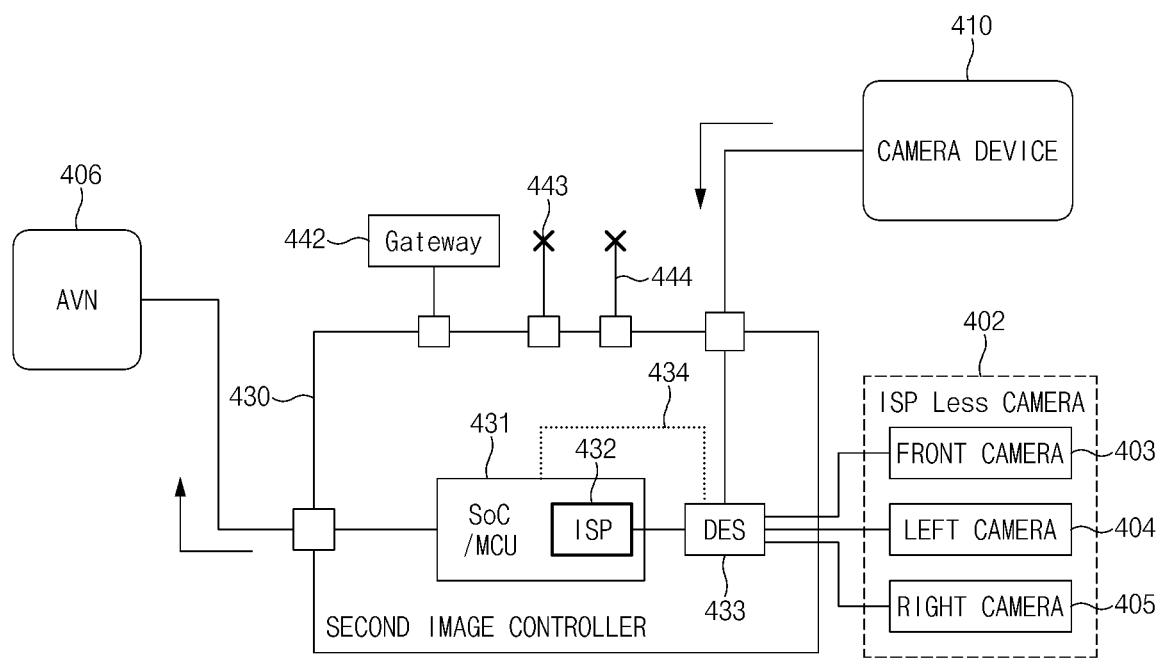
FIG. 4 is a diagram illustrating a case where a second image controller is configured to operate alone according to various exemplary embodiments of the present invention.

FIG. 4 is a diagram illustrating a case where a second image controller is configured to operate alone according to various exemplary embodiments of the present invention.

Referring to FIG. 4, when the first image controller is not included in options of a vehicle, a camera device 410 may transmit information on an obtained image to a second image controller 430.

The second image controller 430 may include an SoC/MCU 431, an ISP 432, and a DES 433 connected to an ISPLess camera 402.

When a first image controller is not included in vehicle options, a surrounding image of the vehicle, which is obtained through the camera device 410 may be directly transmitted to the second image controller 430 without passing through the first image controller.

Features not mentioned in the description of FIG. 4 with respect to the second image controller 430, the SoC/MCU 431, the ISP 432, and the DES 433 connected to the ISPLess camera 402 may be identical to features of the second image controller 230, the SoC/MCU 231, the ISP 232, and the DES 233 connected to the ISPLess camera 202 of FIG. 2.

The DES 433 of the second image controller 430 may directly receive information on a surrounding image of the vehicle from the camera device 410 without passing through the first image controller.

In the instant case, the camera device 410 may or may not have a built-in ISP. When the camera device 410 performs image processing on an image obtained by the camera device 410 by itself because the camera device 410 includes the ISP, the ISP 432 may simply bypass and transmit the processed image received from the camera device 310 to the SoC/MCU 431.

Furthermore, the second image controller 430 may not communicate with the first image controller via communication 442 through a gateway and communication 443 and 444 through a hard wire.

When a first image controller configured for storing surrounding images of the vehicle in a nonvolatile memory in a form of video is not included in the vehicle, the surrounding images of the vehicle obtained by the camera device 410 may be transmitted to an AVN 406, and the AVN 406 may output the surrounding images of the vehicle in real time.

Furthermore, the second image controller 430 may not transmit and receive a reset request, information on control authority for the camera device 410, an ISP-related parameter, and the like with the first image controller.

Figure 5:
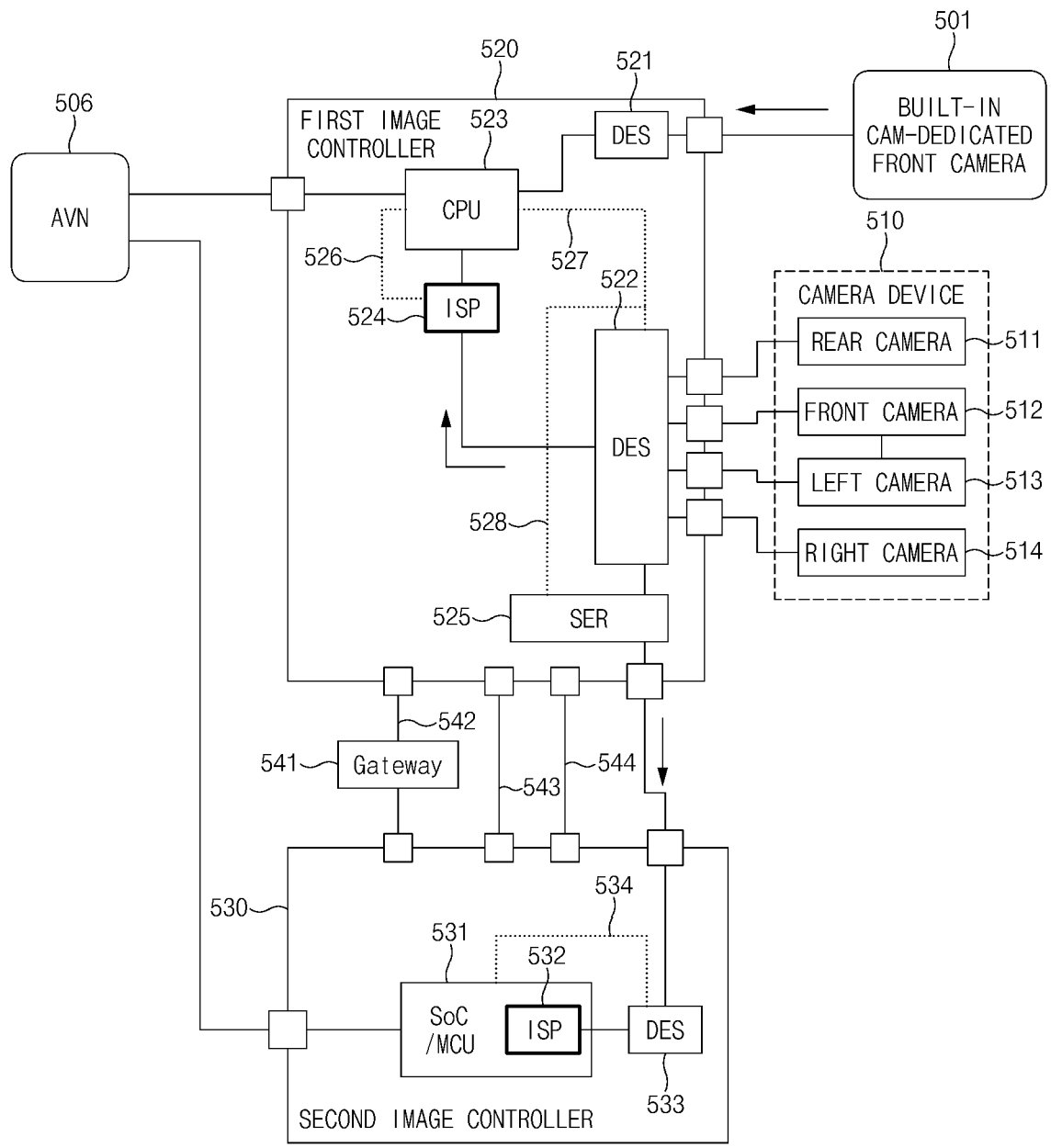
FIG. 5 is a diagram illustrating a camera device including a plurality of cameras according to various exemplary embodiments of the present invention.

FIG. 5 is a diagram illustrating a camera device including a plurality of cameras according to various exemplary embodiments of the present invention.

Referring to FIG. 5, the camera device 510 may include a rear camera 511, a front camera 512, a left camera 513, and a right camera 514.

Features of a built-in cam-dedicated front camera 501, a first image controller 520, DESs 521 and 522, a CPU 523, an ISP 524, an SER 525, a second image controller 530, an SoC/MCU 531, an ISP 532, a DES 533, and an AVN 506, which are not mentioned with reference to FIG. 5, may be identical to the features of the built-in cam-dedicated front camera 201, the first image controller 220, the DESs 221 and 222, the CPU 223, the ISP 224, the SER 225, the second image controller 230, the SoC/MCU 231, the ISP 232, the DES 233, and the AVN 206 of FIG. 2.

For example, the rear camera 511, the front camera 512, the left camera 513, and the right camera 514 included in the camera device 510 may not have a built-in ISP.

For example, the DES 522 and the SER 525 of the first image controller 520 may transmit and receive information on front-view, rear-view, left-view and right-view images of the vehicle obtained by the camera device 510 through one or more physical channels.

For example, the ISP 524 of the first image controller 520 and the ISP 532 of the second image controller 530 may each include one or more ISPs.

The DES 533 of the second image controller 530 may transmit information on the front-view, rear-view, left-view and right-view images of the vehicle obtained through the camera device 510 via the DES 522 and the SER 525 of the first image controller 520.

For example, the DES 533 of the second image controller 530 may not be directly connected to the front camera 512, the left camera 513, and the right camera 514.

For example, the first image controller 520 may store information on front-view, rear-view, left-view and right-view images of the vehicle in the nonvolatile memory in a form of a video.

For example, the second image controller 530 may output front-view, rear-view, left-view and right-view images of the vehicle received through the first image controller 520 through the AVN 506 in real time.

For example, when the vehicle is parked, the second image controller 530 needs to be turned off, and thus the first image controller 520 may supply power to the camera device 510.

Figure 6:
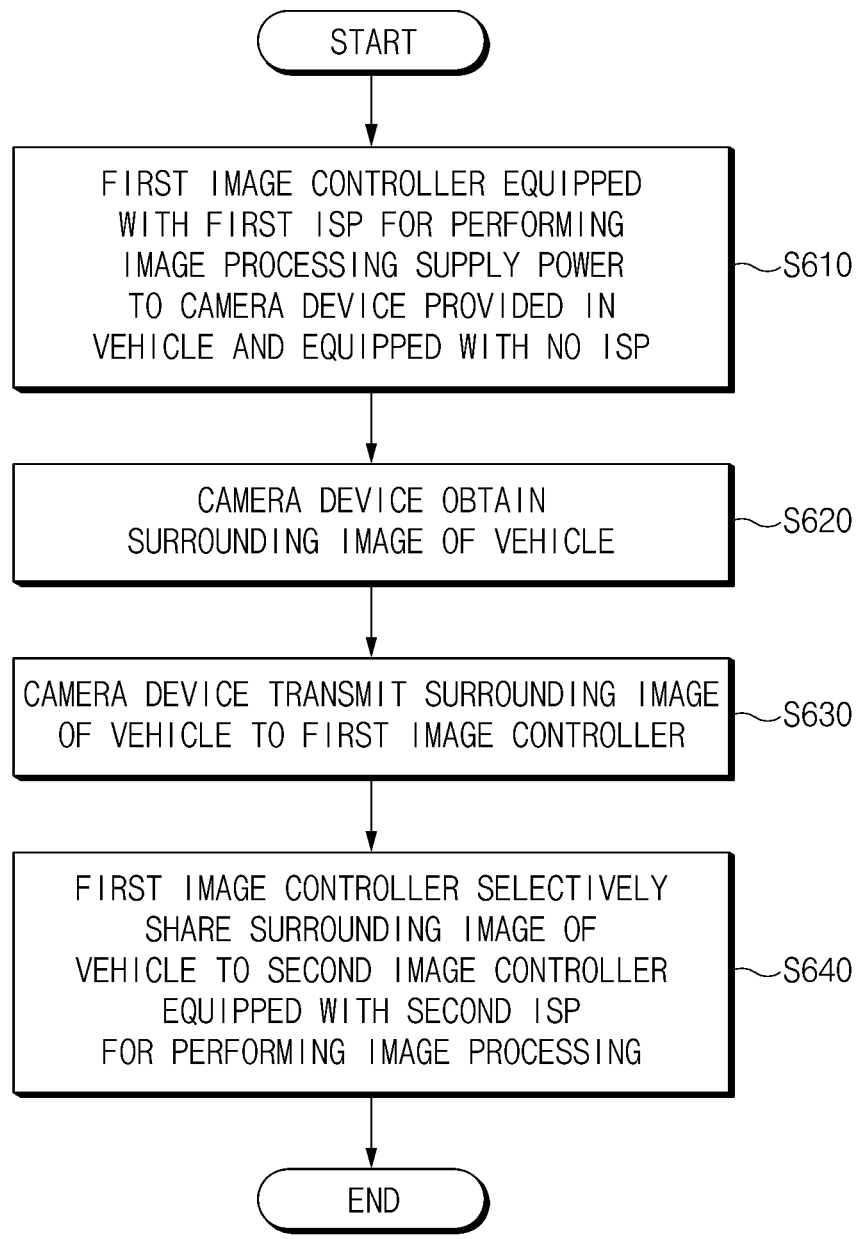
FIG. 6 is a flowchart showing a vehicle image control method according to various exemplary embodiments of the present invention.

FIG. 6 is a flowchart showing a vehicle image control method according to various exemplary embodiments of the present invention.

Referring to FIG. 6, a vehicle image control method may include supplying, by the first image controller 120 equipped with a first ISP configured for performing image processing, power to the camera device 110 provided in a vehicle and equipped with no ISP (S610), obtaining, by the camera device 110, a surrounding image of the vehicle (S620), transmitting, by the camera device 110, the surrounding image to the first image controller 120 (S630), and selectively sharing, by the first image controller 120, the surrounding image with the second image controller 130 equipped with a second ISP configured for performing image processing (S640).

The obtaining, by the camera device 110, the surrounding image of the vehicle (S620) may include obtaining, by the camera device 110, a rear-view image of the vehicle.

The transmitting, by the camera device 110, the surrounding image to the first image controller 120 (S630) may include transmitting, by the camera device 110, the rear-view image obtained by the camera device 110, to the first image controller 120, without image processing on the rear-view image.

The selectively sharing, by the first image controller 120, the surrounding image with the second image controller 130 equipped with a second ISP configured for performing image processing (S640) may include sharing, by the first image controller 120, the surrounding image with the second image controller 130 based on whether the vehicle is driving or the vehicle is parked.

For example, the selectively sharing, by the first image controller 120, the surrounding image with the second image controller 130 equipped with a second ISP configured for performing image processing (S640) may include sharing, by the first image controller 120, the surrounding image with the second image controller 130 when the vehicle is driving.

For example, the vehicle image control method may further include performing, by the first image controller 120, image processing on the surrounding image through the first ISP, and storing, by the first image controller 120, the processed surrounding image in a non-volatile memory.

For example, the vehicle image control method may further include performing, by the second image controller 130, image processing on the surrounding image through the second ISP, and outputting, by the second image controller 130, the processed surrounding image in real time.

For example, the vehicle image control method may further include sharing, by the first image controller 120, no surrounding image with the second image controller 130, and turning off the second image controller 130 when the vehicle is parked.

For example, the vehicle image control method may further include, when it is determined that an abnormality has occurred in the camera device 110, requesting, by the second image controller 130, the first image controller 120 to reset a power supply that supplies power to the camera device 110.

For example, the vehicle image control method may further include, sharing, by the first image controller 120, control authority for the camera device 110 with the second image controller 130.

For example, the vehicle image control method may further include, transmitting, by the second image controller 130, information on a parameter related to image processing for the surrounding image obtained by the camera device 110 to the first image controller 120.

For example, the vehicle image control method may further include sharing, by the first image controller 120, information as to whether the first image controller 120 has control authority for internal communication of the camera device 110 or whether the second image controller 130 has control authority for internal communication of the camera device 110, with the second image controller 130.

According to various exemplary embodiments of the present invention, it is possible to implement a system configured for sharing an image obtained through one or two or more cameras equipped with no ISP. Accordingly, a plurality of controllers may use the images obtained through the camera, achieving the efficiency of in-vehicle communication.

According to various exemplary embodiments of the present invention, a plurality of controllers may switch image control of one or two or more cameras equipped with no ISP with each other, minimizing power consumption.

The operations of the method or the algorithm described in connection with the exemplary embodiments disclosed herein may be embodied directly in hardware or a software module executed by the processor, or in a combination thereof. The software module may reside on a storage medium (that is, the memory and/or the storage) such as a RAM, a flash memory, a ROM, an EPROM, an EEPROM, a register, a hard disk, a removable disk, and a CD-ROM.

The exemplary storage medium may be coupled to the processor, and the processor may read information out of the storage medium and may record information in the storage medium. Alternatively, the storage medium may be integrated with the processor. The processor and the storage medium may reside in an application specific integrated circuit (ASIC). The ASIC may reside within a user terminal. In another case, the processor and the storage medium may reside in the user terminal as separate components.

The above description is merely illustrative of the technical idea of the present invention, and various modifications and variations may be made without departing from the essential characteristics of the present invention by those skilled in the art to which various exemplary embodiments of the present invention pertains.

Accordingly, the exemplary embodiment disclosed in various exemplary embodiments of the present invention is not intended to limit the technical idea of the present invention but to describe the present invention, and the scope of the technical idea of the present invention is not limited by the embodiment. The scope of protection of the present invention should be interpreted by the following claims, and all technical ideas within the scope equivalent thereto should be construed as being included in the scope of the present invention.

The effects of the vehicle image control apparatus and the method thereof according to various exemplary embodiments of the present invention are provided as follows.

According to at least one of embodiments of the present invention, it is possible to provide a vehicle image control apparatus configured for an image of a vehicle camera equipped with no image signal processors (ISP).

According to at least one of embodiments of the present invention, it is possible to provide a vehicle image control apparatus of facilitating the application of a technology for transferring an ISP, which had been built in a camera, to a controller and a method thereof.

According to at least one of embodiments of the present invention, it is possible to a vehicle image control apparatus of facilitating switching of control between a plurality of controllers for controlling images of a camera equipped with no ISPs and a method thereof.

According to at least one of embodiments of the present invention, it is possible to provide a vehicle image control apparatus of minimizing power consumption by appropriately operating a plurality of controllers for controlling images of a camera provided with no ISP while driving and parking, and a method thereof.

According to at least one of embodiments of the present invention, it is possible to provide a vehicle image control apparatus of implementing an efficient vehicle image related system by sharing one or more cameras equipped with no ISP in a plurality of controllers.

Furthermore, various effects may be provided that are directly or indirectly understood through the present invention.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A vehicle image control apparatus comprising:
a camera device provided in a vehicle and equipped with no image signal processor (ISP) configured to obtain a surrounding image of the vehicle and to transmit the surrounding image to a first image controller;
the first image controller equipped with a first ISP for performing image processing and configured to supply power to the camera device and to selectively share the surrounding image with a second image controller; and
the second image controller equipped with a second ISP and configured for performing image processing,
wherein the first image controller is configured to:
transmit information on a parameter related to image processing through the ISP to the second image controller;
perform image processing on the surrounding image through the first ISP based on the received information on the parameter related to image processing through the ISP;
obtain whether the vehicle is driving or whether the vehicle is parked from a driving system, which is connected to the first image controller;
communicate with the second image controller through hard wires, and wherein the second image controller is configured to:
transmit information on a parameter related to image processing for the surrounding image obtained by the camera device to the first image controller;
perform image processing on the surrounding image through the second ISP based on the received information on the parameter related to image processing through the ISP; and
obtain whether the vehicle is driving or whether the vehicle is parked from the driving system, which is connected to the second image controller.

2. The vehicle image control apparatus of claim 1, wherein the first image controller is configured to:
perform the image processing on the surrounding image through the first ISP, and
store the processed surrounding image in a non-transitory storage medium.

3. The vehicle image control apparatus of claim 1, wherein the second image controller is configured to:
perform the image processing on the surrounding image through the second ISP, and
output the processed surrounding image in real time.

4. The vehicle image control apparatus of claim 1, wherein the camera device includes a camera configured to obtain a rear-view image of the vehicle.

5. The vehicle image control apparatus of claim 1, wherein the camera device includes two or more cameras that obtain surrounding images in different directions with respect to the vehicle.

6. The vehicle image control apparatus of claim 1, wherein the first image controller is configured to share the surrounding image to the second image controller when the vehicle is driving.

7. The vehicle image control apparatus of claim 1, wherein the first image controller is configured to share the surrounding image with the second image controller when the vehicle is parked, and
wherein the second image controller is configured to be turned off when the vehicle is parked.

8. The vehicle image control apparatus of claim 1, wherein the second image controller is configured to request the first image controller to reset a power supply that supplies the power to the camera device when the second image controller determines that an abnormality has occurred in the camera device.

9. The vehicle image control apparatus of claim 1, wherein the first image controller is configured to share control authority for the camera device with the second image controller.

10. The vehicle image control apparatus of claim 1, wherein the first image controller is configured to share information as to whether the first image controller has control authority for internal communication of the camera device or whether the second image controller has the control authority for internal communication of the camera device, with the second image controller.

11. A vehicle image control method comprising:
supplying, by a first image controller equipped with a first ISP configured for performing image processing, power to a camera device provided in a vehicle and equipped with no ISP;
obtaining, by the camera device, a surrounding image of the vehicle;
transmitting, by the camera device, the surrounding image to the first image controller; and
selectively sharing, by the first image controller, the surrounding image with a second image controller equipped with a second ISP configured for performing image processing;
transmit, by the first image controller, information on a parameter related to image processing through the ISP to the second image controller;
perform, by the first image controller, image processing on the surrounding image through the first ISP based on the received information on the parameter related to image processing through the ISP;
obtain, by the first image controller, whether the vehicle is driving or whether the vehicle is parked from a driving system, which is connected to the first image controller;
communicate, by the first image controller, with the second image controller through hard wires;
transmit, by the second image controller, information on a parameter related to image processing for the surrounding image obtained by the camera device to the first image controller;
perform, by the second image controller, image processing on the surrounding image through the second ISP based on the received information on the parameter related to image processing through the ISP; and
obtain, by the second image controller, whether the vehicle is driving or whether the vehicle is parked from the driving system, which is connected to the second image controller.

12. The vehicle image control method of claim 11, further including:
performing, by the first image controller, image processing on the surrounding image through the first ISP; and
storing, by the first image controller, the processed surrounding image in a non-transitory storage medium.

13. The vehicle image control method of claim 11, further including:
- performing, by the second image controller, image processing on the surrounding image through the second ISP; and
- outputting, by the second image controller, the processed surrounding image in real time.

14. The vehicle image control method of claim 11, wherein the selectively sharing, by the first image controller, of the surrounding image with the second image controller equipped with the second ISP configured for performing the image processing includes sharing, by the first image controller, the surrounding image with the second image controller when the vehicle is driving.

15. The vehicle image control method of claim 11, further including:
- sharing, by the first image controller, no surrounding image with the second image controller when the vehicle is parked; and
- turning off the second image controller when the vehicle is parked.

16. The vehicle image control method of claim 11, further including:
- requesting, by the second image controller, the first image controller to reset a power supply that supplies the power to the camera device when the second image controller determines that an abnormality has occurred in the camera device.

17. The vehicle image control method of claim 11, further including:
- sharing, by the first image controller, control authority for the camera device with the second image controller.

18. The vehicle image control method of claim 11, further including:
- sharing, by the first image controller, information as to whether the first image controller has control authority for internal communication of the camera device or whether the second image controller has the control authority for the internal communication of the camera device, with the second image controller.

* * * * *